United States Patent [19]
Schulte

[11] Patent Number: 5,520,404
[45] Date of Patent: May 28, 1996

[54] TRAILER HITCH

[76] Inventor: Joseph A. Schulte, 1234 New York Ave., Sheboygan, Wis. 53081

[21] Appl. No.: 402,850

[22] Filed: Mar. 13, 1995

[51] Int. Cl.⁶ ..................................................... B60D 1/14
[52] U.S. Cl. ...................................... 280/460.1; 280/489
[58] Field of Search ............................ 280/456.1, 460.1, 280/483, 489, 504, 505, 80.1, 81.1, 81.6, 86, 78

[56] References Cited

U.S. PATENT DOCUMENTS

| | | | |
|---|---|---|---|
| 1,739,716 | 12/1929 | Fisher | 280/460.1 X |
| 4,305,602 | 12/1981 | Ungvari et al. | 280/460.1 |
| 4,512,593 | 4/1985 | Ehrhardt | 280/460.1 |
| 4,664,403 | 5/1987 | Livingston | 280/460.1 |

*Primary Examiner*—Kevin T. Hurley
*Attorney, Agent, or Firm*—Francis J. Bouda

[57] ABSTRACT

A hitch or towing device to connect a trailer having at least two swivelable ground-contacting wheels to an automobile or similar prime mover includes two arms to connect the trailer to the prime mover. The arms are flexible in a vertical direction but rigid in a longitudinal and in a sidewise direction. This permits the automobile to push the trailer backwards and also permits relative motion between the trailer and the automobile in roll and pitch but not in yaw. In a preferred embodiment the arms connecting the trailer to the automobile are leaf springs, and couplings permanently fastened to the automobile engage the front end of the springs in a hinge-like manner, the hinge-pin being easily removable to facilitate connecting and disconnecting of trailer and automobile.

13 Claims, 5 Drawing Sheets

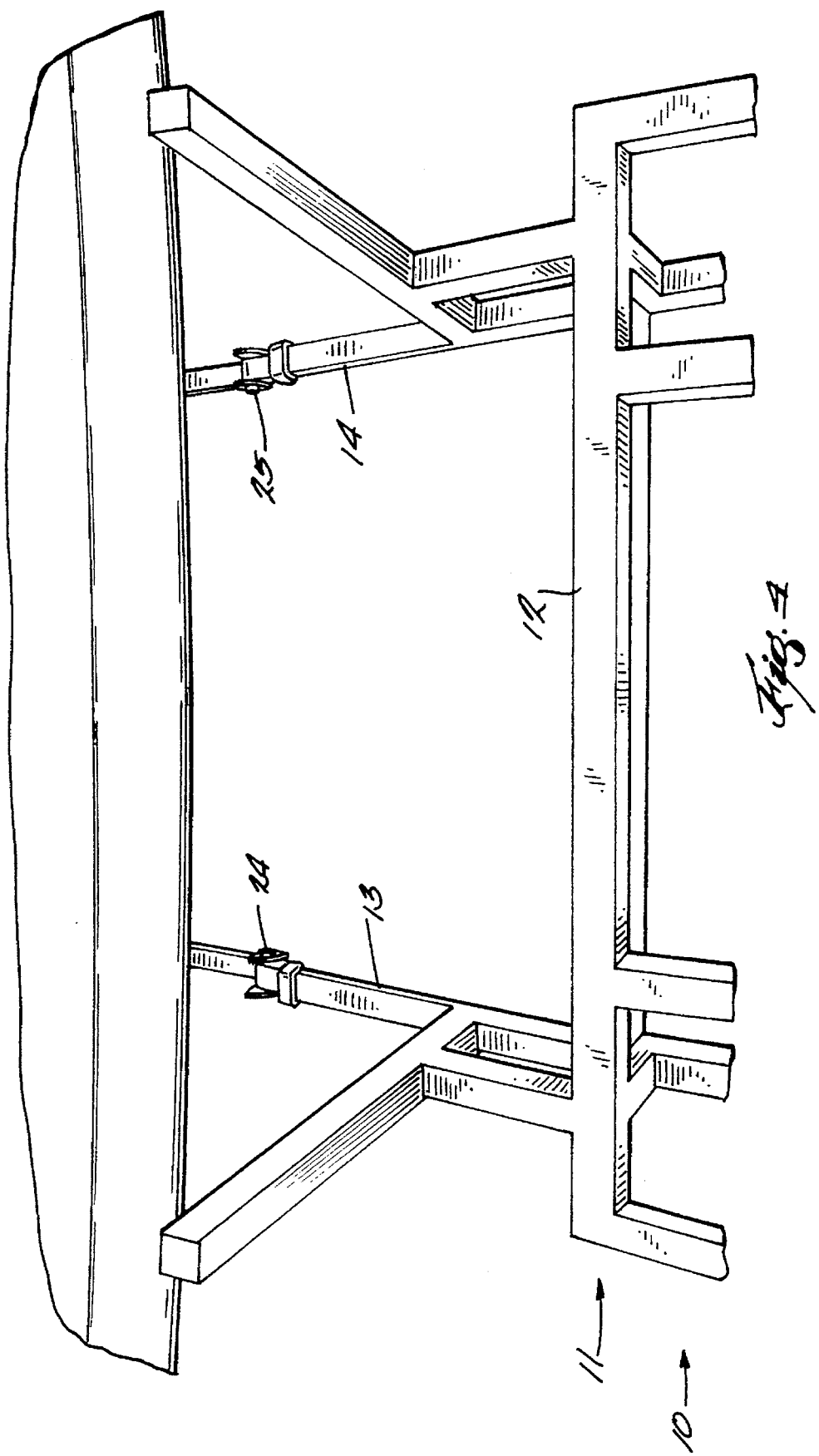

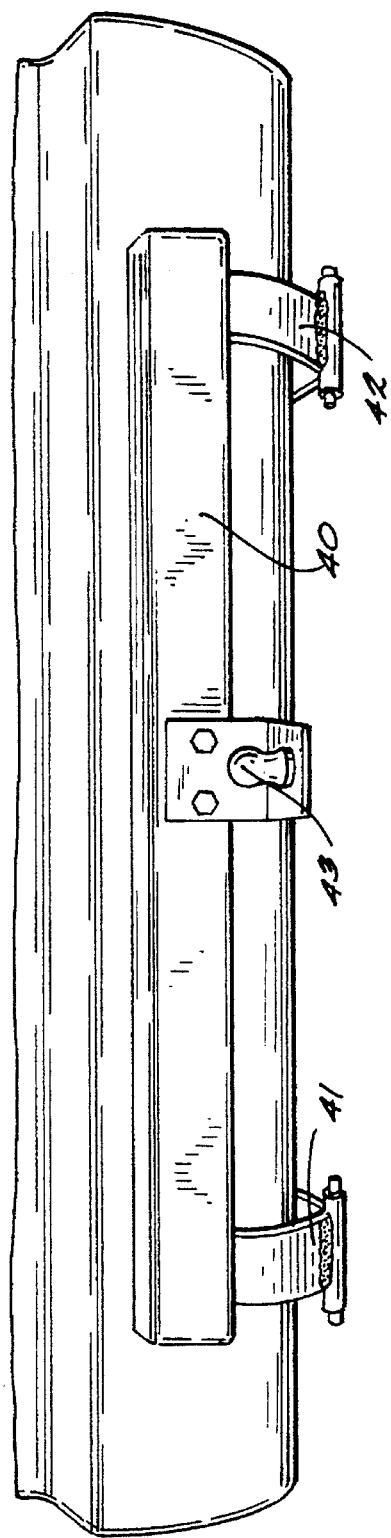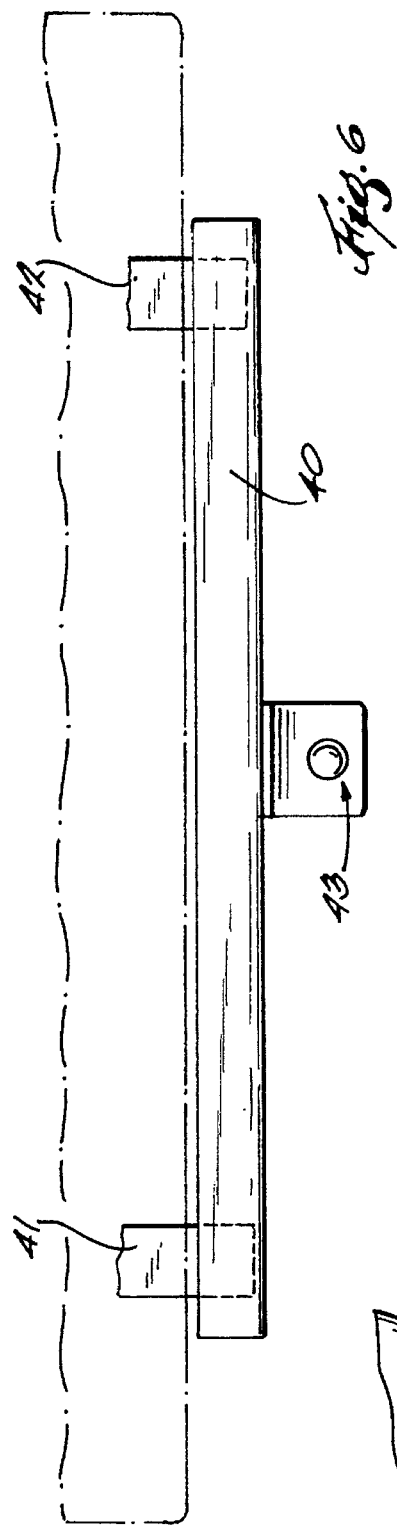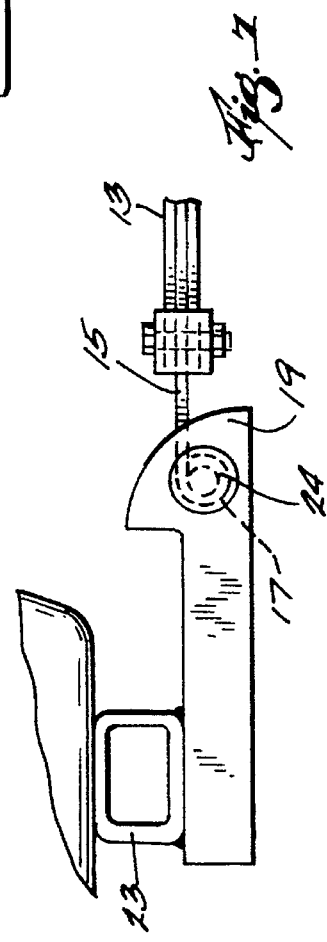

TRAILER HITCH

BACKGROUND OF THE INVENTION

Vehicles to be towed behind other vehicles (trailers) are not new, and in the past these non-motorized vehicles have generally been towed by a one-point ball and socket hitch, with two or more wheels under the trailer. This provided a very satisfactory towing arrangement for turning and also for passing over bumps or obstacles, but it was extremely difficult to move in a rearward direction (backup), especially by a person not experienced in handling towable vehicles.

Many years ago a trailer was developed which had a two-bar attachment to the towing vehicle, with a single wheel in the center of the trailer. That wheel was pivotable and inasmuch as the trailer was attached at two points, a backing-up operation could be performed because the trailer wheel pivoted and the trailer was pushed backward following the precise movement or direction of the vehicle. Quite often the two-point attachment to the towing vehicle was by clamps affixed to the bumpers.

However, the big disadvantage of such a trailer was that the one-point contact with the ground, i.e., the single pivotable wheel, caused great instability for heavy loads which extended sidewards and outwardly beyond the single wheel. Frequently the trailer would twist on the tow bars, and the entire trailer would collapse in a sideward direction. Because the forces were directed to the bumper, the bumper would also be damaged.

Thus it can be seen that a trailer with one pivotable wheel, and a rigid two-bar hitch arrangement is not new, but the disadvantages of such equipment are evident.

SUMMARY OF THE INVENTION

Therefore, my invention consists of a trailer which is connected at two points to the automobile or the tractor, and includes at least two individually and independently swivelable wheels, and is pulled directly from the frame of the towing vehicle by spring-like tow-bars.

The wheels trail behind the axis of attachment to the trailer when the automobile is moving in a forward direction, but when the vehicle is moved backwardly, the trailer also moves backwardly directly as an extension of the automobile, and the caster wheels pivot so that they once again follow behind the point of attachment.

Moreover, not only can the trailer of the present invention be driven easily rearwardly, it also has a very stable load-to-ground arrangement if the road conditions cause the auto and the trailer independently to "roll" around a horizontal longitudinal axis extending through the auto and the trailer. The improvement which permits stability in roll as well as pitch and yaw includes leaf springs or similar tow-bar attaching means connecting the trailer to the towing vehicle.

Because the leaf springs are rigid in a longitudinal direction, the automobile can push the trailer backwardly. Nevertheless, the springs are flexible in a vertical direction so that a roll of the trailer is possible independently of the roll of the automobile. Therefore, roll as well as pitch and yaw are controlled by the present invention.

The forward ends of the towbars are attached to the vehicle by horizontal pins in a hinge-like clevis or shackle. Thus, as the automobile and the trailer travel over uneven or hilly ground, the two vehicles pivot about the hinge, accomodating the "pitch" in the trailer which is different from the "pitch" in the vehicle.

Therefore, an object of the present invention is to provide a hitch arrangement for a trailer, said hitch insuring stability of the trailer in pitch, yaw and roll conditions, and also permitting the trailer to be pushed backwardly when the towing vehicle is backed up.

Another object of the present invention is to provide a trailer which is sound and stable and secure, and can easily be pushed backwardly by a driver of the towing vehicle unskilled in towing an object behind the vehicle.

Still a further object of the present invention is to provide a hitch which can be easily attached by simple pin and latch connections to brackets mounted on the automobile.

Yet another object is to provide a hitch which can be either permanently or removably attached to a vehicle and which will not interfere with the design performance of the automobile's rear bumper.

Another object is to provide a trailer hitch which can accomodate both single-bar towing or two-bar towing.

With the above and other objects in view, further information and a better understanding of the present invention may be achieved by referring to the following detailed description.

DESCRIPTION OF THE PREFERRED EMBODIMENT

FIG. 4 is a top angular perspective view of the towbars of the trailer attached to an automobile.

FIG. 5 is a perspective view of an attachment for an automobile which accepts both a one-point ball-and-coupling hitch, as well as the two-point hitch arrangement of the present invention.

FIG. 6 is a line drawing of the side view of a hitch of the present invention attached to the rear of an automobile.

FIG. 7 is a line drawing of the top view of a hitch of the present invention which can accomodate single-bar or two-bar towing arrangements.

Figure 1:
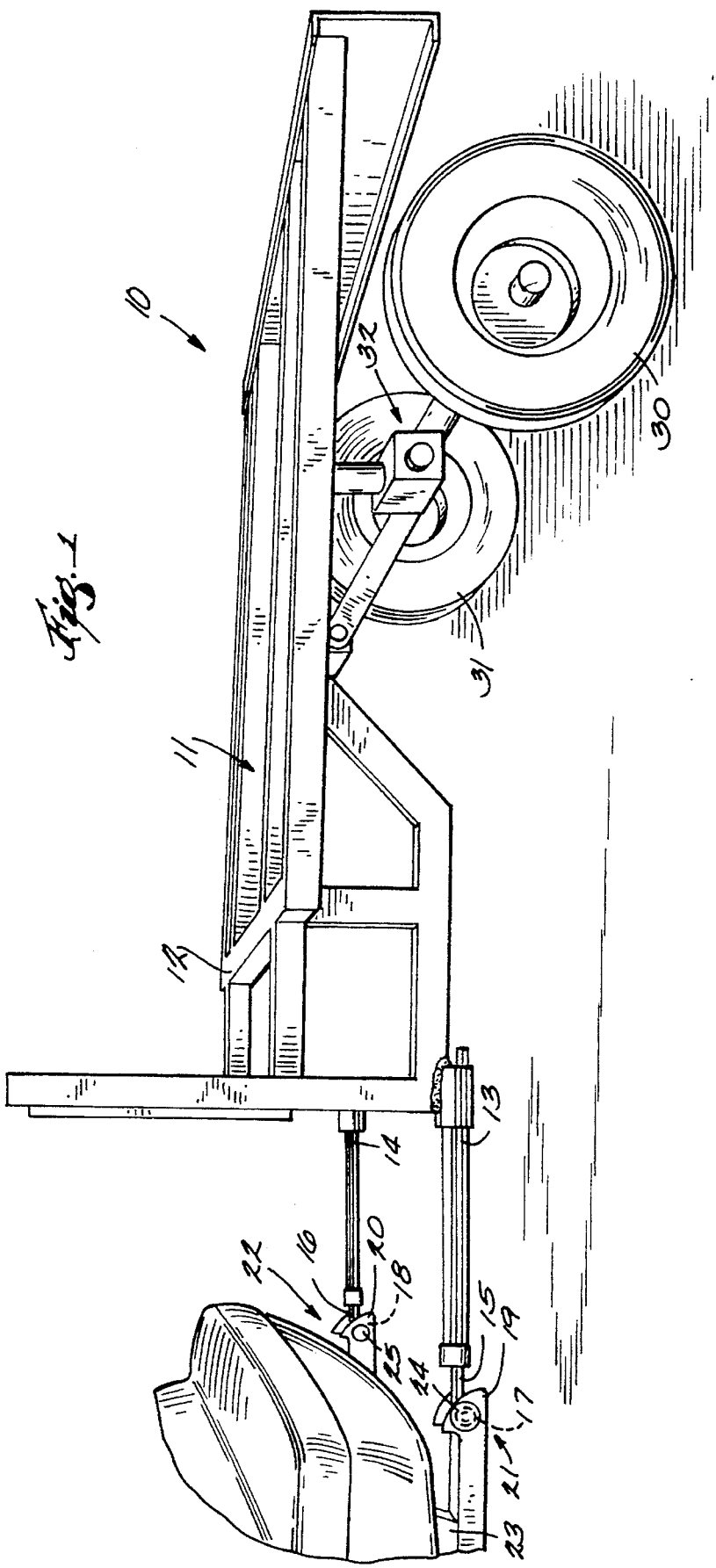
FIG. 1 is a left-side perspective view of the trailer when moving in a forward direction.

Referring now to FIG. 1, a trailer 10 has a frame or body 11 of generally well-known construction, on which a body or box (not shown) can be mounted. The front 12 of the trailer has a pair of connecting arms 13 and 14 rigidly attached thereto.

The front ends 15 and 16 of the arms 13 and 14 have coupling brackets or forged eyes 17 and 18 which connect with mating portions 19 and 20 of connecting brackets 21 and 22 attached to the frame of the car 23. Removable pins 24 and 25 connect the coupling brackets 17 and 18 to the connecting brackets 21 and 22 in a horizontal, hinge-like manner, so as to permit the arms 13 and 14 to pivot about the pins 24 and. 25. This type of connection is often referred to as a shackle.

The tow-bar arms 13 and 14 are more clearly shown in FIG. 4. In this embodiment they are made of flat, rigid leaf springs.

By removing the pins 24 and 25, the front ends 15 and 16 of the leaf spring arms can be detached from the connecting brackets 21 and 22. This provides quick and easy attachment to or detachment of the trailer from the vehicle.

Figure 2:
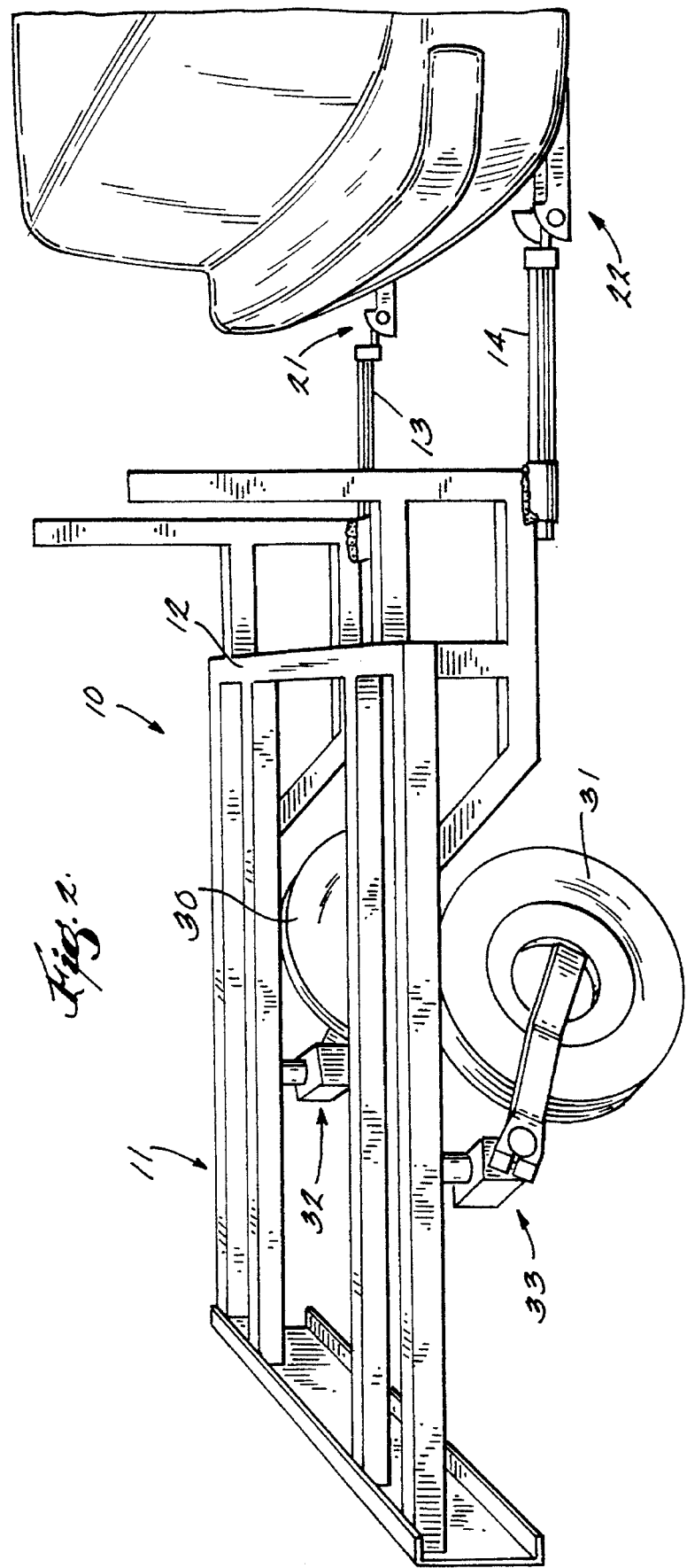
FIG. 2 is a right-side perspective view of the trailer attached to an automobile moving in a rearward direction.

As can be seen in FIG. 2, the wheels 30 and 31 of the trailer are caster-type wheels with the pivot attachment 32 and 33 for each wheel securely welded or otherwise fastened to the underside of the trailer body 11. The illustration in FIG. 1 shows the wheels trailing behind the pivots when the automobile goes forward, and the wheels shown in FIG. 2 are between the automobile and the pivot attachment when the combination auto and trailer are moving rearwardly.

Figure 3:
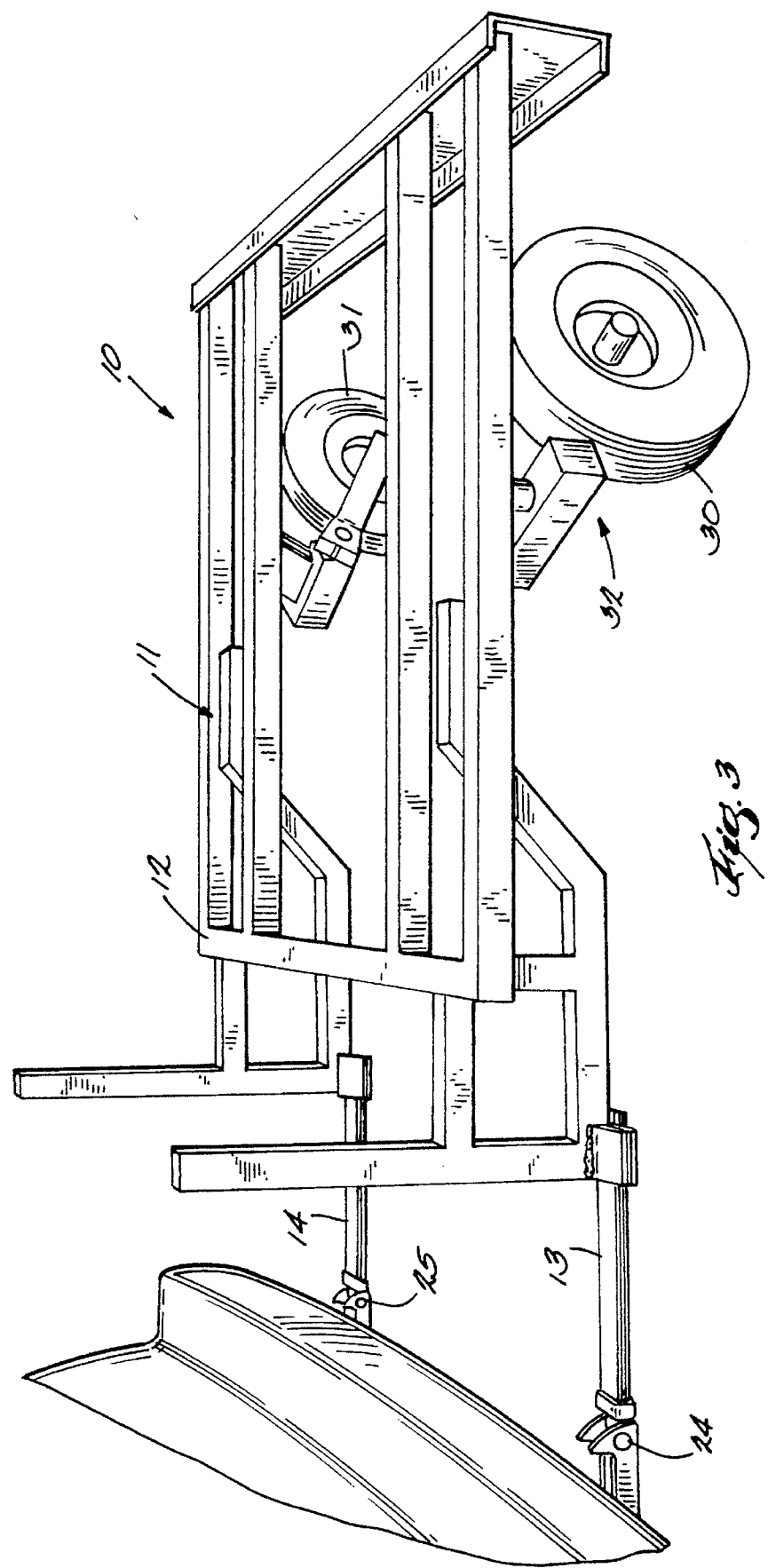
FIG. 3 is a angular perspective view of a trailer attached to an automobile as it turns a curve, showing how the trailer wheels pivot behind the automobile.

Because the wheels 30 and 31 caster independently of each other and of the automobile, they can be adapted to easy turning around curves where the rear of the trailer must swing outwardly behind the automobile, as shown in FIG. 3.

Although the connecting brackets 21 and 22 may be permanently secured to the automobile 23, in some cases it is preferred to have the brackets removable from the vehicle, and re-affixed to the automobile only when it is desired to tow a trailer.

Therefore, in the preferred embodiment, the connecting brackets 21 and 22 are attached to the automobile 23 in such a way that there is no impediment to or interference with the functional design of the bumper 26 regardless of whether the connecting brackets 21 and 22 are permanently or removably attached to the automobile. All forces between trailer and the towing vehicle are transmitted directly to the framework of the vehicle through these connecting brackets.

Thus it is easy to connect the trailer to the automobile merely by engaging the coupling portions 15 and 16 of the arms 13 and 14 with the mating portions 19 and 20 of the connecting brackets 21 and 22 by slipping the pins 24 and 25 through such hinge-like (or shackle) arrangement.

In another embodiment of the invention shown in FIGS. 5 and 7, I show how another type of hatch, which can be removably fastened to the connecting brackets 21 and 22, provides a pulling arrangement for a single-bar trailer as well as a two-bar trailer.

In FIG. 5, a rigid beam 40 is fastened by beam-connections 41 and 42 to the automobile 23 by the connecting brackets 21 and 22. The beam 40 includes a single ball-type coupling member 43. This enables the owner of the vehicle and the trailers to trail behind the automobile either the two-towbar trailer of the present invention, or a single towbar trailer fastened by the pivotable ball and coupling connection 43.

FIG. 7 shows how supplemental connecting brackets 44 and 45 may be a part of the beam 40. Thus the trailer may be connected to the automobile 23 either directly by the connecting brackets 21 and 22 or by the supplemental connecting brackets 44 and 45.

In any case, the hitch provides for the combination of a pair of vertically flexible arms on a trailer to a pair of connecting brackets affixed to an automobile to ensure backing-control as well as roll-control and pitch-control between trailer and automobile.

It is furthermore to be understood that the present invention may be embodied in other specific forms without departing from the spirit or special attributes; and it is, therefore, desired that the present embodiments be considered in all respects as illustrative and, therefore, not restrictive, reference being made to the appended claims rather than to the foregoing description to indicate the scope of the invention.

Having thus described the invention, what is claimed as new and desired to protect by Letters Patent are the following:

1. A trailer with a towing hitch for pulling behind a vehicle, said hitch including:

a pair of leaf-spring arms affixed to said trailer, each of said arms having a coupling bracket at its forward end, a pair of connecting brackets for securement to said vehicle, said connecting brackets having mating portions for operative engagement with said coupling brackets.

2. The trailer of claim 1 wherein said arms are flexible in a vertical direction, but rigid in a longitudinal and in a sidewise direction.

3. The trailer of claim 1 including connecting pins for separably engaging the coupling brackets of said arms with the mating portions of said connecting brackets.

4. The trailer of claim 1 including a beam which can be separably engaged with said connecting brackets and which includes a single centrally-located ball for a ball and socket connection.

5. The trailer of claim 4 including supplemental connecting brackets having mating portions for engaging said coupling brackets.

6. The trailer of claim 1 wherein said trailer is a two-wheel trailer.

7. The trailer of claim 4 wherein said trailer is a two-wheel trailer.

8. The trailer of claim 6 wherein the wheels of said two-wheel trailer are swivelable caster wheels.

9. A towing hitch for pulling a trailer having two swivelable wheels behind a vehicle, said hitch including:

a pair of leaf-spring arms adapted to be affixed to said trailer, each of said arms having a coupling bracket at its forward end, a pair of connecting brackets for securement to said vehicle, said connecting brackets having mating portions for operative engagement with said coupling brackets.

10. The hitch of claim 9 wherein said arms are flexible in a vertical direction, but rigid in a longitudinal and in a sidewise direction.

11. The hitch of claim 9 including connecting pins for separably engaging the coupling brackets of said arms with the mating portions of said connecting brackets.

12. The hitch of claim 9 including a beam which can be separably engaged with said connecting brackets and which includes a single centrally-located ball for a ball and socket connection.

13. The hitch of claim 12 which includes supplemental connecting brackets having mating portions for engaging said coupling brackets.

* * * * *